United States Patent [19]
Chen

[11] Patent Number: 6,039,394
[45] Date of Patent: Mar. 21, 2000

[54] PIVOTABLE SEAT STRUCTURE FOR A BICYCLE

[75] Inventor: Tian-Chu Chen, Shen Kang Hsiang, Taiwan

[73] Assignee: Kalloy Industrial Co., Ltd., Taichung Hsien, Taiwan

[21] Appl. No.: 09/356,901

[22] Filed: Jul. 20, 1999

[51] Int. Cl.[7] ..................... B62J 1/00
[52] U.S. Cl. ................. 297/195.1; 297/215.15
[58] Field of Search ............ 297/195.1, 195.11, 297/215.13, 215.15, 331, 335, 336

[56] References Cited

U.S. PATENT DOCUMENTS

| | | | |
|---|---|---|---|
| 491,578 | 2/1893 | Mercer | 297/215.15 X |
| 4,836,604 | 6/1989 | Romano | 297/215.15 A |
| 5,441,327 | 8/1995 | Sanderson | 297/195.1 |
| 5,855,410 | 1/1999 | Lin | 297/195.1 X |

Primary Examiner—Peter R. Brown
Attorney, Agent, or Firm—Rosenberg, Klein & Lee

[57] ABSTRACT

A pivotable seat structure for a bicycle includes a seat post having a block formed on the top thereof, a positioning post passing through the rear end of the block, an abutting flange formed on the block, and an elastic pad mounted on the middle of the block, an inverted U-shaped supporting bracket defining a receiving space for receiving the block and having a front end pivotally mounted on the front end of the block and a rear end defining an sector slot, an inverted V-shaped driver having a front end formed with a hook detachably urged on the positioning post and a rear end passing through the sector slot and formed with a press block, a torsion spring having a front end abutting the front end of the driver for forcing the hook to urge on the positioning post, and a rear end urged on the bottom of the supporting bracket, and a seat fixedly mounted on the supporting bracket.

6 Claims, 6 Drawing Sheets

PIVOTABLE SEAT STRUCTURE FOR A BICYCLE

BACKGROUND OF THE INVENTION

1. Field of the Invention

The present invention relates to a pivotable seat structure for a bicycle.

2. Description of the Related Prior Art

A conventional bicycle includes a seat, two bending tubes each fixed on the bottom of the seat and each fixed to a seat clamp which is fixed to a seat post, thereby fixing the seat to the seat post. When a chamber is contained under the seat for storing articles, a user will have to detach the seat from the seat post to expose the chamber by using tools due to the seat being fixed on the seat post, thereby easily incurring inconvenience to the user.

SUMMARY OF THE INVENTION

The primary objective of the present invention is to provide a pivotable seat structure for a bicycle comprising a seat post including a block formed on the top thereof, the block having a front end, a rear end and two sides, a positioning post passing through the rear end of the block, an abutting flange formed on each of the two sides of the block, and an elastic pad mounted on the middle of the block; a substantially inverted U-shaped supporting bracket abutting the abutting flange and defining a receiving space for receiving the block, the supporting bracket having a front end pivotally mounted on the front end of the block and a rear end having a side wall defining an sector slot; a substantially inverted V-shaped driver pivotally mounted in the receiving space and having a front end formed with a hook detachably urged on the positioning post and a rear end passing through the sector slot and formed with a press block; a torsion spring mounted in the receiving space and having a front end abutting the front end of the driver for forcing the hook to urge on the positioning post, and a rear end urged on the bottom of the supporting bracket; and a seat fixedly mounted on the supporting bracket.

Further objectives and advantages of the present invention will become apparent after a careful reading of the detailed description with reference to the accompanying drawings.

DETAILED DESCRIPTION OF THE PREFERRED EMBODIMENTS

Figure 1:
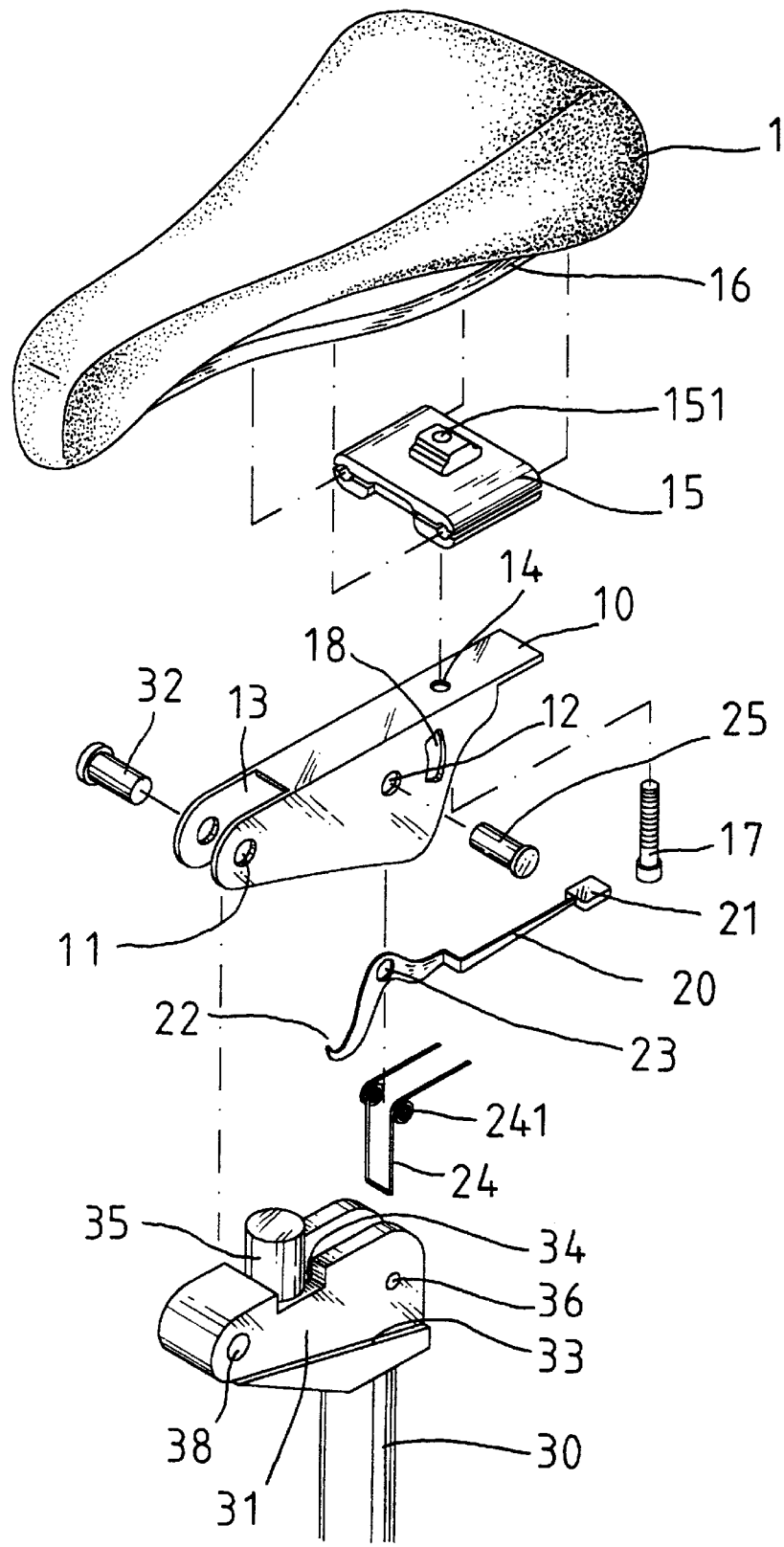
FIG. 1 is an exploded view of a pivotable seat structure for a bicycle according to the present invention.
Figure 2:
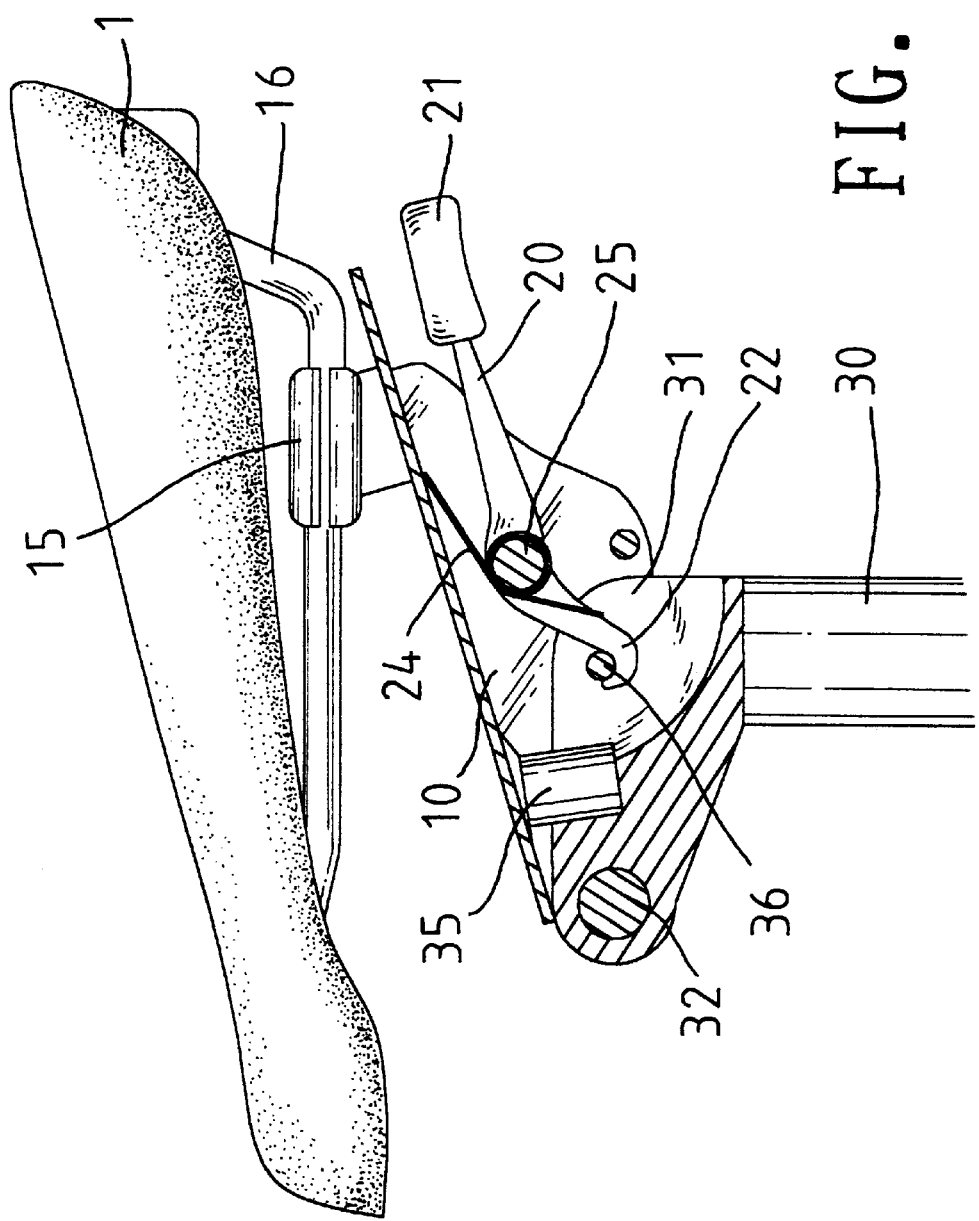
FIG. 2 is a front plan cross-sectional assembly view of the pivotable seat structure as shown in FIG. 1.
Figure 3:
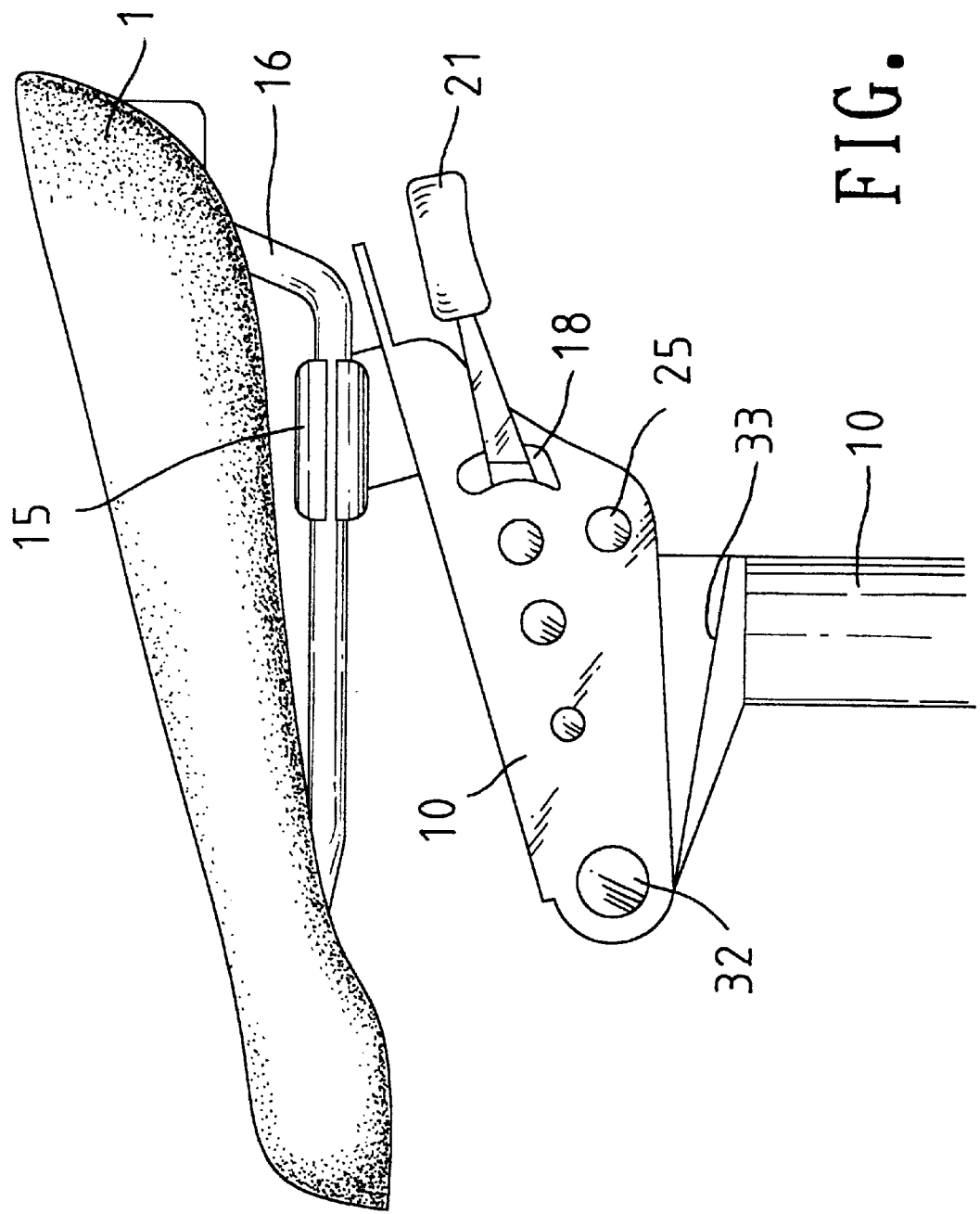
FIG. 3 is a front plan assembly view of the pivotable seat structure as shown in FIG. 1.

With reference to FIGS. 1–3, a pivotable seat structure for a bicycle according to the present invention comprises a seat post 30 including a block 31 formed on the top thereof, the block 31 having a front end, a rear end and two sides, a positioning post 36 passing through the rear end of the block 31, an abutting flange 33 formed on each of the two sides of the block 31, and an elastic pad 35 mounted on the middle of the block 31; a substantially inverted U-shaped supporting bracket 10 abutting the abutting flange 33 and defining a receiving space 13 for receiving the block 31, the supporting bracket 10 having a front end pivotally mounted on the front end of the block 31 and a rear end having a side wall defining an sector slot 18; a substantially inverted V-shaped driver 20 pivotally mounted in the receiving space 13 and having a front end formed with a hook 22 detachably urged on the positioning post 36 and a rear end passing through the sector slot 18 and formed with a press block 21; a torsion spring 24 mounted in the receiving space 13 and having a front end abutting the front end of the driver 20 for forcing the hook 22 to urge on the positioning post 36, and a rear end urged on the bottom of the supporting bracket 10; a seat clamp 15 fixedly mounted on the supporting bracket 10; a seat 1 fixedly mounted on the seat clamp 15; and two bending tubes 16 each fixedly mounted on the bottom of the seat and each clamped in the seat clamp 15.

The supporting bracket 10 has a hole 14 defined in the rear end thereof, the seat clamp 15 defines a screw hole 151 aligning with the hole 14, and the pivotable seat structure comprises a positioning bolt 17 passing through the hole 14 of the supporting bracket 10 and the screw hole 151 of the seat clamp 15, thereby fixing the seat clamp 15 to the supporting bracket 10.

The front end of the supporting bracket 10 defines a front pivot hole 13, the front end of the block 31 defines a pivot hole 38, and the pivotable seat structure comprises a pin 32 passing through the front pivot hole 13 of the supporting bracket 10 and through the pivot hole 38 of the block 31 such that the front end of the supporting bracket 10 is pivoted to the front end of the block 31. The block 31 has a recess 34 defined in the middle thereof for receiving the elastic pad 35 therein. The rear end of the supporting bracket 10 defines a rear pivot hole 12, the torsion spring 24 defines a pivot hole 241 aligning with the rear pivot hole 12, the driver 20 has a hole 23 defined in the middle thereof aligning with the pivot hole 241, and the pivotable seat structure comprises a pin 25 passing through the rear pivot hole 12 of the supporting bracket 10, the pivot hole 241 of the torsion spring 24, and the hole 23 of the driver 20 such that the driver 20 is pivoted in the supporting bracket 10.

Figure 4:
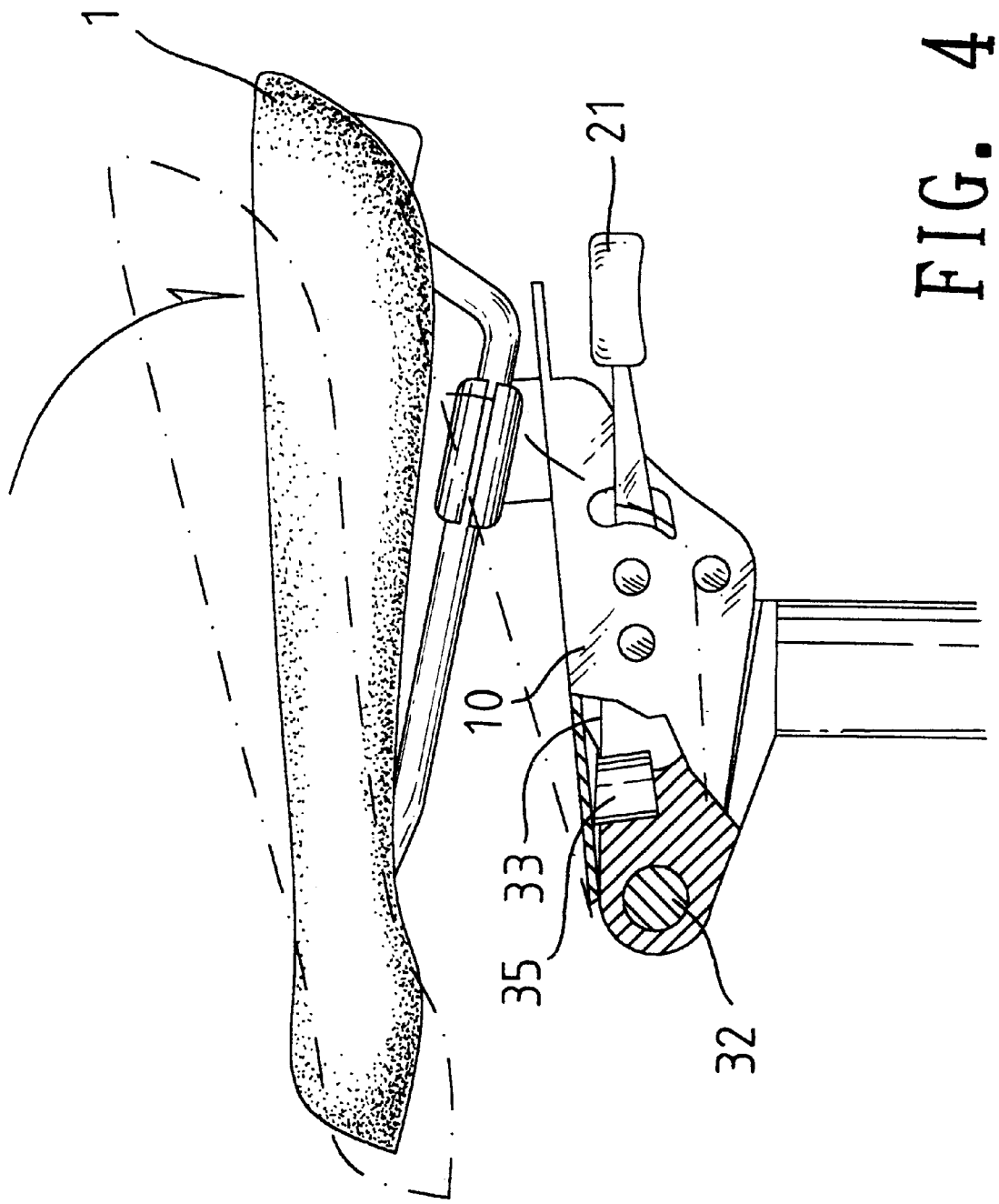
FIG. 4 is an operational view of the pivotable seat structure as shown in FIG. 2.

As shown in FIGS. 2 and 3, the bottom of the supporting bracket 10 abuts the elastic pad 35. As shown in FIG. 4, when the seat 1 is pressed downward, the supporting bracket 10 is forced to urge on the elastic pad 35 such that the bottom of the supporting bracket 10 abuts the abutting flange 33, thereby providing a shock absorbing effect to the seat 1. As shown in FIG. 2, when the seat 1 is pressed downward, the rear end of the torsion spring 24 is urged by the supporting bracket 10 to pivot the torsion spring 24 relative to the pin 25, thereby moving the front end of the torsion spring 24 to urge on the front end of the driver 20 such that the hook 22 of the driver 20 is urged on the positioning post 36 in a stable and rigid manner.

Figure 5:
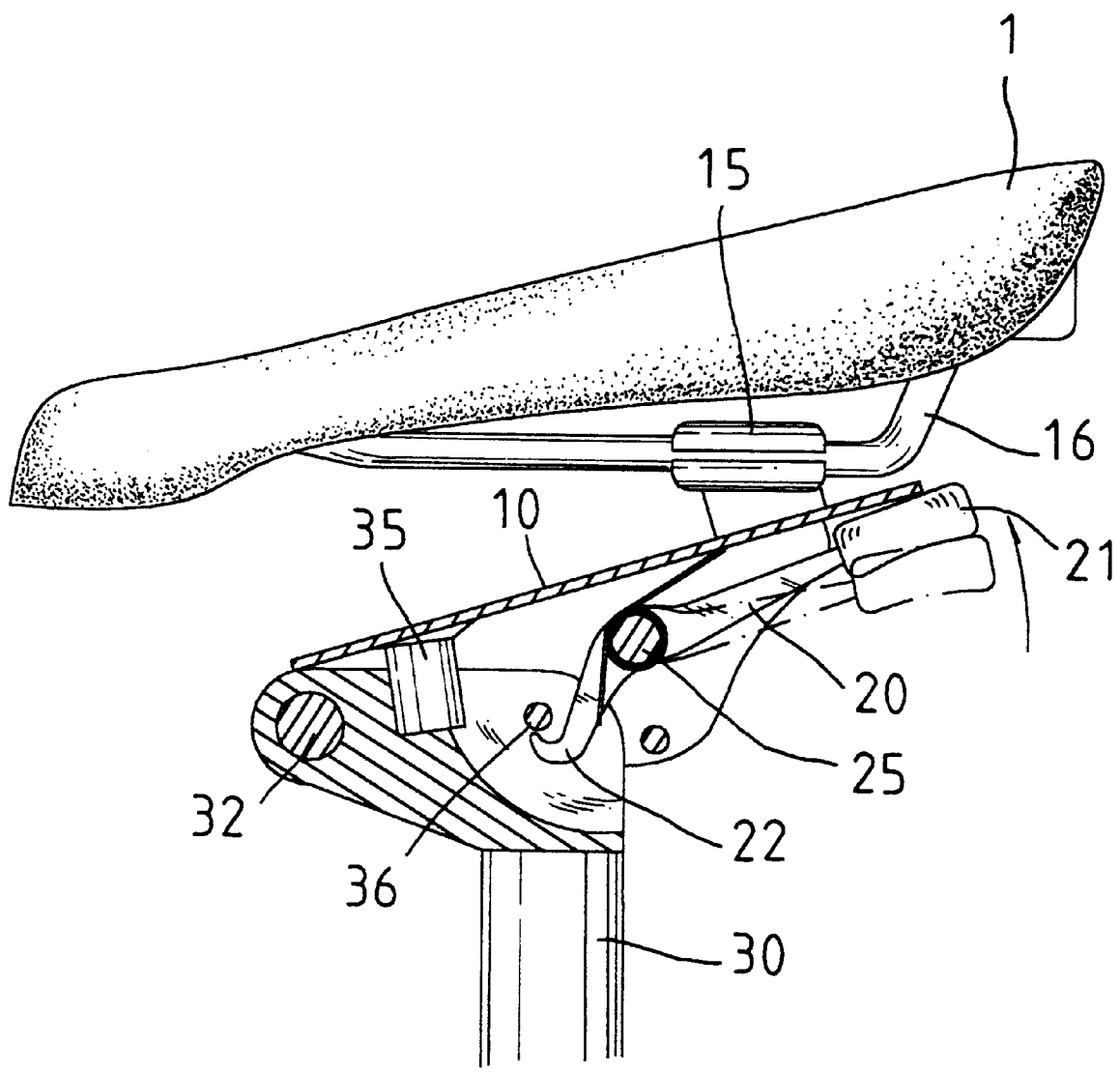
FIG. 5 is an operational view of the pivotable seat structure as shown in FIG. 2.
Figure 6:
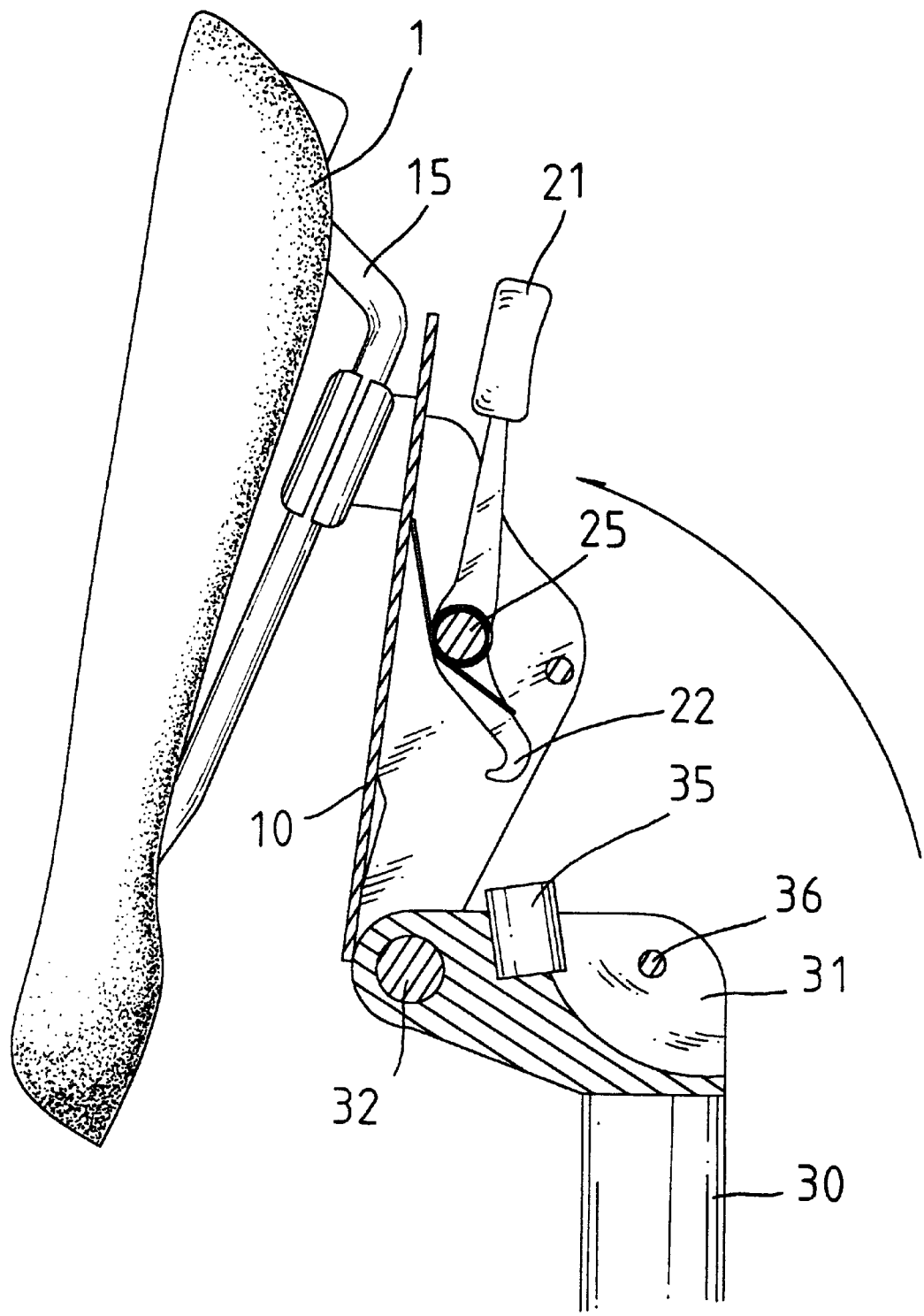
FIG. 6 is an operational view of the pivotable seat structure as shown in FIG. 5.

As shown in FIGS. 5 and 6, the press block 21 can be lifted to pivot the driver 20 relative to the pin 25 so as to move the hook 22 downward, thereby detaching the hook 22 from the positioning post 36 as shown in FIG. 5 such that the supporting bracket 10 and the seat 1 can be pivoted about the pin 32 relative to the block 31 of the seat post 30 as shown in FIG. 6, thereby pivoting the seat 1 and the supporting bracket 10.

Although the present invention has been described with a certain degree of particularity, it is to be understood that the present disclose has been made by way of example only and that many other possible modifications and variations can be made without departing from the scope of the present invention.

I claim:

1. A pivotable seat structure for a bicycle comprising: a seat post including a block formed on the top thereof, the block having a front end, a rear end and two sides, a positioning post passing through the rear end of the block, an abutting flange formed on each of the two sides of the block, and an elastic pad mounted on the middle of the block; a substantially inverted U-shaped supporting bracket abutting the abutting flange and defining a receiving space for receiving the block, the supporting bracket having a front end pivotally mounted on the front end of the block and a rear end having a side wall defining a sector slot; a substantially inverted V-shaped driver pivotally mounted in the receiving space and having a front end formed with a hook detachably urged on the positioning post and a rear end passing through the sector slot and formed with a press block; a torsion spring mounted in the receiving space and having a front end abutting the front end of the driver for forcing the hook to urge on the positioning post, and a rear end urged on the bottom of the supporting bracket; and a seat fixedly mounted on the supporting bracket.

2. The pivotable seat structure as claimed in claim 1, wherein the front end of the supporting bracket defines a front pivot hole, the front end of the block defines a pivot hole, and the pivotable seat structure further comprises a pin passing through the front pivot hole of the supporting bracket and through the pivot hole of the block such that the front end of the supporting bracket is pivoted to the front end of the block.

3. The pivotable seat structure as claimed in claim 1, wherein the block has a recess defined in the middle thereof for receiving the elastic pad therein.

4. The pivotable seat structure as claimed in claim 1, wherein the rear end of the supporting bracket defines a rear pivot hole, the torsion spring defines a pivot hole aligning with the rear pivot hole, the driver has a hole defined in the middle thereof aligning with the pivot hole, and the pivotable seat structure further comprises a pin passing through the rear pivot hole of the supporting bracket, the pivot hole of the torsion spring, and the hole of the driver such that the driver is pivoted in the supporting bracket.

5. The pivotable seat structure as claimed in claim 1, further comprising a seat clamp fixedly mounted on the supporting bracket, and two bending tubes each fixedly mounted on the bottom of the seat and each clamped in the seat clamp.

6. The pivotable seat structure as claimed in claim 5, wherein the supporting bracket has a hole defined in the rear end thereof, the seat clamp defines a screw hole aligning with the hole, and the pivotable seat structure further comprises a positioning bolt passing through the hole of the supporting bracket and the screw hole of the seat clamp, thereby fixing the seat clamp to the supporting bracket.

* * * * *

UNITED STATES PATENT AND TRADEMARK OFFICE
CERTIFICATE OF CORRECTION

PATENT NO. : 6,039,394
DATED : MARCH 21, 2000
INVENTOR(S) : TIAN-CHU CHENG

It is certified that error appears in the above-identified patent and that said Letters Patent is hereby corrected as shown below:

On title page,
item [75]; delete the name "Tian-Chu Chen" and insert the name --Tian-Chu Cheng--

Signed and Sealed this

Third Day of April, 2001

*Attest:*

NICHOLAS P. GODICI

*Attesting Officer*  *Acting Director of the United States Patent and Trademark Office*